United States Patent
Aoyama et al.

[11] Patent Number: 5,835,614
[45] Date of Patent: Nov. 10, 1998

[54] IMAGE PROCESSING APPARATUS

[75] Inventors: Chiaki Aoyama; Takaharu Sekine, both of Wako, Japan

[73] Assignee: Honda Giken Kogyo Kabushiki Kaisha, Tokyo, Japan

[21] Appl. No.: 346,354

[22] Filed: Nov. 29, 1994

Related U.S. Application Data

[63] Continuation of Ser. No. 84,289, Jun. 28, 1993, abandoned.

[30] Foreign Application Priority Data

Jun. 26, 1992 [JP] Japan .................................. 4-193165

[51] Int. Cl.$^6$ ..................................................... G06K 9/00
[52] U.S. Cl. .......................... 382/104; 382/199; 382/274
[58] Field of Search .................................. 382/173, 199, 382/313, 274, 271, 272, 270, 104; 358/457, 566, 518, 528; 364/478

[56] References Cited

U.S. PATENT DOCUMENTS

| | | | |
|---|---|---|---|
| 4,118,687 | 10/1978 | McWaters et al. | 382/313 |
| 4,143,358 | 3/1979 | Neff | 382/313 |
| 4,183,013 | 1/1980 | Agrawala et al. | 340/146.3 AC |
| 4,189,711 | 2/1980 | Frank | 340/146.3 H |
| 4,638,369 | 1/1987 | Hsieh | 358/283 |
| 4,642,813 | 2/1987 | Wilder | 382/8 |
| 4,648,120 | 3/1987 | Chittineni | 382/54 |
| 4,873,644 | 10/1989 | Fujii et al. | 364/478 |
| 4,906,940 | 3/1990 | Greene et al. | 382/16 |
| 4,942,533 | 7/1990 | Kakinami et al. | 364/449 |
| 5,003,615 | 3/1991 | Seitz | 382/22 |
| 5,109,425 | 4/1992 | Lawton | 382/1 |
| 5,113,252 | 5/1992 | Horie et al. | 358/77 |

FOREIGN PATENT DOCUMENTS

| | | |
|---|---|---|
| 61-25279 | 5/1986 | Japan . |
| 63-53584 | 6/1988 | Japan . |
| 64-1067 | 8/1989 | Japan . |
| 2236689 | 4/1990 | Japan . |

OTHER PUBLICATIONS

English language abstracts of the above–identified Japanese applications.

*Primary Examiner*—Joseph Mancuso
*Attorney, Agent, or Firm*—Lyon & Lyon

[57] ABSTRACT

The image processing apparatus comprises: a pixel train setting unit for setting a pixel train; a moving average calculating unit for estimating the intensity of light illuminating the object as a moving average of luminance of the pixel train; a reflectance calculating unit for converting the luminance of the pixel into reflectance, with the luminance of the pixel divided by the estimated intensity of light; a digitizing unit for digitizing the reflectance of the pixel; an edge detecting means for detecting an edge at which the luminance of the image changes sharply; and a comparing means for comparing the digitized reflectance signal with the edge signal to detect a boundary of regions having different luminance from each other, to eliminate it from the digitized reflectance signal for being a false edge.

18 Claims, 8 Drawing Sheets

IMAGE PROCESSING APPARATUS

This is a continuation of application Ser. No. 08/084,289, filed on Jun. 28, 1993 and which designated the U.S. now abandoned.

BACKGROUND OF THE INVENTION

1. Field of the invention

This invention relates to an image processing apparatus for detecting boundaries between regions of an object having different reflectance to each other from an image signal of the object.

2. Description of the Related Art

In order to reliably detect white lines drawn on a road surface from a image signal for providing a guiding information for vehicles such as in-factory carts or automobiles, it is a common practice to digitize the brightness of the white lines and the road surface by giving a signal value "1" to the white lines and "0" to the road surface.

Some of techniques of digitizing an image signal are disclosed in Japanese Patent Application Laid-Open Publication No. 2-236689, 61-25279 or 64-1067, or Japanese Patent Application Post-Exam Publication No. 63-53584, for example.

Of these prior art techniques, there is known one in which digitization is effected based on the results of comparing the difference between the luminance of a pixel in attention and the average luminance of its surrounding pixels with a threshold value (see formula (1)).

$$\text{(luminance of pixel in attention)} - \text{(average luminance)} - \text{(threshold value)} <, > 0 \quad (1)$$

Assume that the digitization process expressed by the formula 1 is applied to cases where the luminance of the white line is 60 when the average luminance is 30, viz, it is bright; while the luminance of the white line is 20 when the average luminance is 10, viz, it is dark. Here, the threshold value is taken to be 15. In both cases, the white line is expected to have a binary digit "1". However, as seen in calculations (2) and (3) below, the results for the respective cases are not identical.

In a bright circumstance:

$$60-30-15=15>0 \quad (2)$$

In a dark circumstance:

$$20-10-15=-5<0 \quad (3)$$

It should be concluded, therefore, that when the same combination of the white line and the road surface is placed under different lighting conditions, the digitization process expressed by the formula 1 may give inconsistent results.

When the white line is detected for the purpose of guiding vehicles, it is essential to obtain consistent results in the digitization process regardless of whether the road surface is bright or dark. However, it is clear that the digitization process described above cannot suffice this requirement.

Further, there is another problem. Other than the boundary of the white lines, there can be boundaries, on the road surface, between a bright area and shadows of such as buildings, cars running on the other or opposite lanes, or the like. However, there has not been known an effective scheme to distinguish the boundary between bright and dark areas of the road surface from the boundary of the white line.

SUMMARY OF THE INVENTION

The present invention has been made to solve the above-mentioned problems.

It is therefore an object of the invention to provide an image processing apparatus which is capable of detecting white lines drawn on a road surface without being affected by the lightness of the road surface.

It is another object of the invention to provide an image processing apparatus which is capable of distinguishing boundaries on the road surface between a bright area and shadows of such as buildings, other cars or the like, from the boundary of the white line.

To achieve the above object, the image processing apparatus according to the invention, for processing the signal of an input image including a plurality of pixels, each pixel having the luminance representative of the intensity of the reflected light from an object, is characterized by comprising: estimating means for estimating the intensity of light illuminating the object at the location of a pixel of attention; reflectance calculating means for converting the luminance of the pixel into reflectance, with the luminance of the pixel divided by the estimated intensity of light illuminating the object at the location of the pixel; digitizing means for binary-digitizing the reflectance of the pixel by comparing the reflectance of the pixel with a threshold value, and for outputting a digitized reflectance signal; and boundary recognizing means for recognizing a boundary between regions having digitized reflectance signal values different from each other in the image.

Further, the estimating means, in the above-described apparatus, comprises: pixel train setting means for setting a pixel train having therein the pixel of attention and a specified number of pixels adjacent to the pixel; and moving average calculating means for estimating the intensity of light illuminating the object at the location of the pixel as a moving average of luminance calculated with respect to the pixel train.

Still further, the boundary recognition means in the above-described apparatus, comprises: edge detecting means for detecting, at the location of the pixel of attention, an edge as a succession of pixels in front and in rear of which the luminance of the image changes sharply, and for outputting an edge signal; and comparing means for comparing the digitized reflectance signal with the edge signal to detect a boundary of regions in the image having different luminance from each other, thereby to eliminate a part of digitized reflectance signal corresponding to the detected boundary due to the difference of luminance.

The operations in the image processing apparatus of the invention will now be described.

When an object is illuminated with light, the intensity of the reflected light is determined by the reflectance of the surface of the object. The reflectance does not normally vary depending on the intensity of the light illuminating the object.

reflectance=intensity of reflected light/intensity of illuminating light

The intensity of the reflected light for each unit area of the surface of the object is the luminance. In the image processing apparatus according to the invention, therefore, the intensity of the reflected light is represented by the luminance of a pixel of attention. The intensity of illuminating light, in itself, has to be measured by a separate device other than a camera. In the present invention, however, a moving average of luminance with respect to multiple pixels adjacent to the pixel of attention is used as an alternative characteristic of the intensity of illuminating light.

Accordingly, in the present invention, a quantity represented by the following formula (4) is named as "reflectance".

$$\text{reflectance} = \text{luminance of pixel of attention}/\text{moving-averaged luminance of adjacent pixels} \quad (4)$$

The luminance of each pixel is normalized by converting it into the reflectance by use of formula (4).

By the way, when the above-mentioned white line data in the bright and dark circumstances are substituted in the formula (4), the both converted signals become 2, as seen from calculations (5) and (6). This means that the same results are obtained for both cases regardless of the intensity of illuminating light. By comparing thus obtained reflectance with a judging threshold, a digitization process can be stably effected.

$$\text{Under a bright circumstance: } 60/20=2 \quad (5)$$

$$\text{Under a dark circumstance: } 20/10=2 \quad (6)$$

It becomes possible to recognize a boundary on a road surface between regions each having different reflectance from each other by using the digitized reflectance, as follows.

Namely, when there are white lines in the image, the luminance varies sharply before and after the boundaries between the white lines and the road surface. The edge detecting means included in the image processing apparatus of the invention recognizes variation in the luminance at the boundaries of the white lines as edges. When there are shadows of buildings, other cars or the like on the road surface, together with the white lines, the edge detecting means detects an edge at the boundary of the brightness and shadows on the road surface. It should be noted, however, that in the case of the white line, a pair of edges are produced corresponding to one white line, but in the case of the shadow, only one edge is produced corresponding to the boundary of the brightness and shadow.

On the other hand, in the digitalized reflectance signal, there are "1" valued peaks corresponding to the respective white lines, together with the "1" valued peak corresponding to the boundary of the brightness and shadow. Comparing the digitized reflectance signal with the edge signal, up and down: "0" to "1" and "1" to "0", in the waveform of the digitized reflectance signal respectively correspond to the pair edges in the edge signal at the boundaries of one white line, whereas, either of up: "0" to "1" or down: "1" to "0", in the waveform of the digitized reflectance signal at the boundary of the brightness and shadow of the road surface corresponds to the single edge in the edge signal.

Based on the results of the comparison, the edges corresponding to the white lines can be discriminated from a "false edge" at the boundary of the brightness and shadow of the road surface, and the peaks in the digitized reflectance signal corresponding to the white lines are established by eliminating the peak corresponding to the false edge.

The reflectance signal according to the formula (4) is generated normally by using the luminance at the pixel of attention only. However, an average of luminance of the pixel of attention and a few pixels adjacent thereto may be used for this purpose. Effects of noise in the image signal upon the reflectance can be reduced.

The length of the pixel train, for calculating the moving average of the luminance, is set proportionally to the width of the image of the white line on each scan line. On the scan line corresponding to a distant place, the pixel train is given a short length, and on a near place, a long length.

DETAILED DESCRIPTION OF THE PREFERRED EMBODIMENT

An embodiment of the image processing apparatus according to the invention will be described in detail with reference to the accompanying drawings and photographs.

Figure 1:
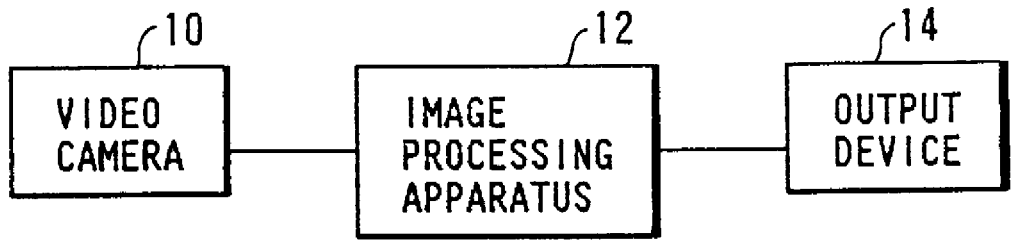
FIG. 1 is a block diagram showing an embodiment of the image processing apparatus according to the present invention.

FIG. 1 is a block diagram showing the structure of one embodiment of the image processing apparatus according to the present invention.

Figure 2:
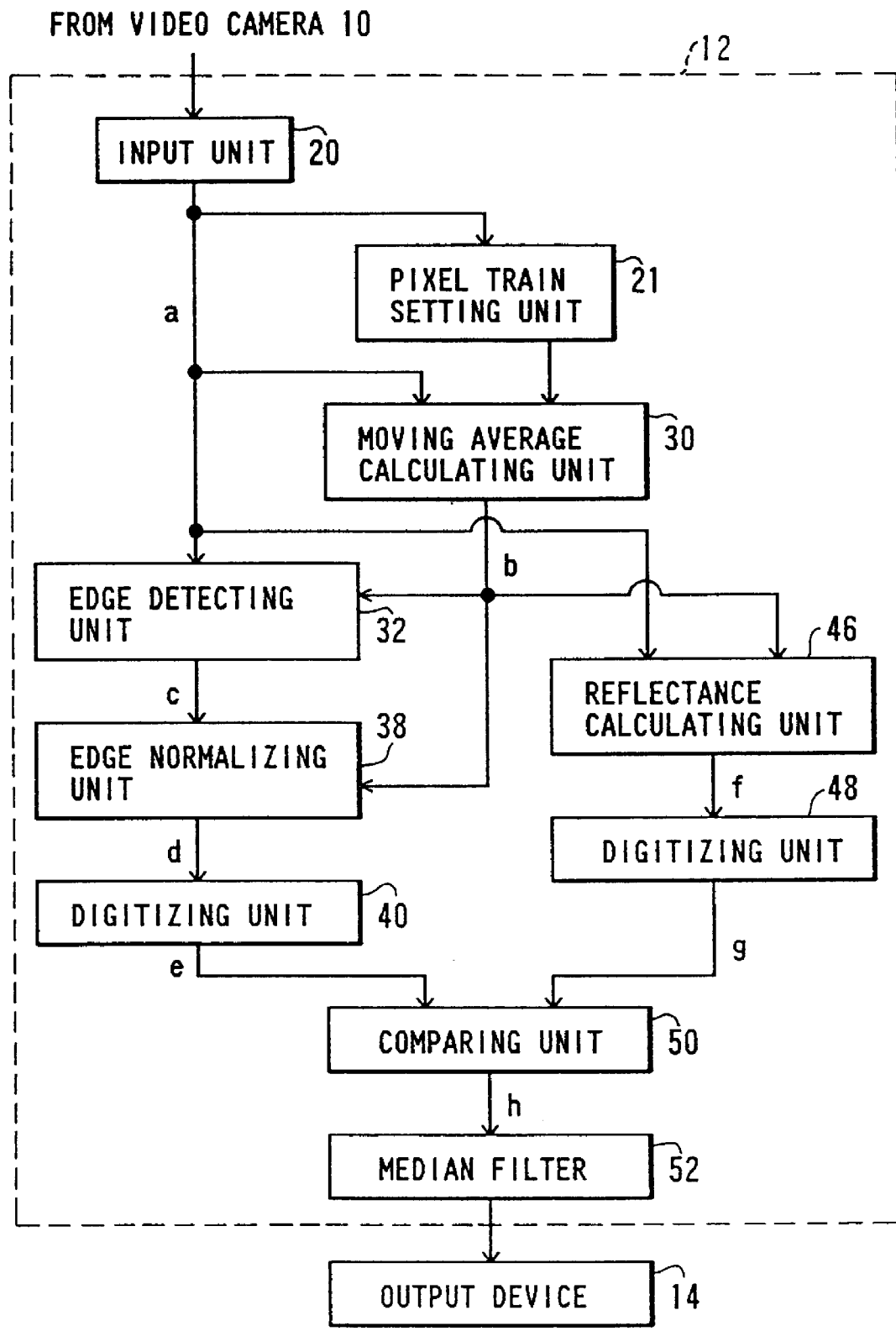
FIG. 2 is a block diagram illustrating process blocks included in the image processing apparatus shown in FIG. 1.
Figure 3:
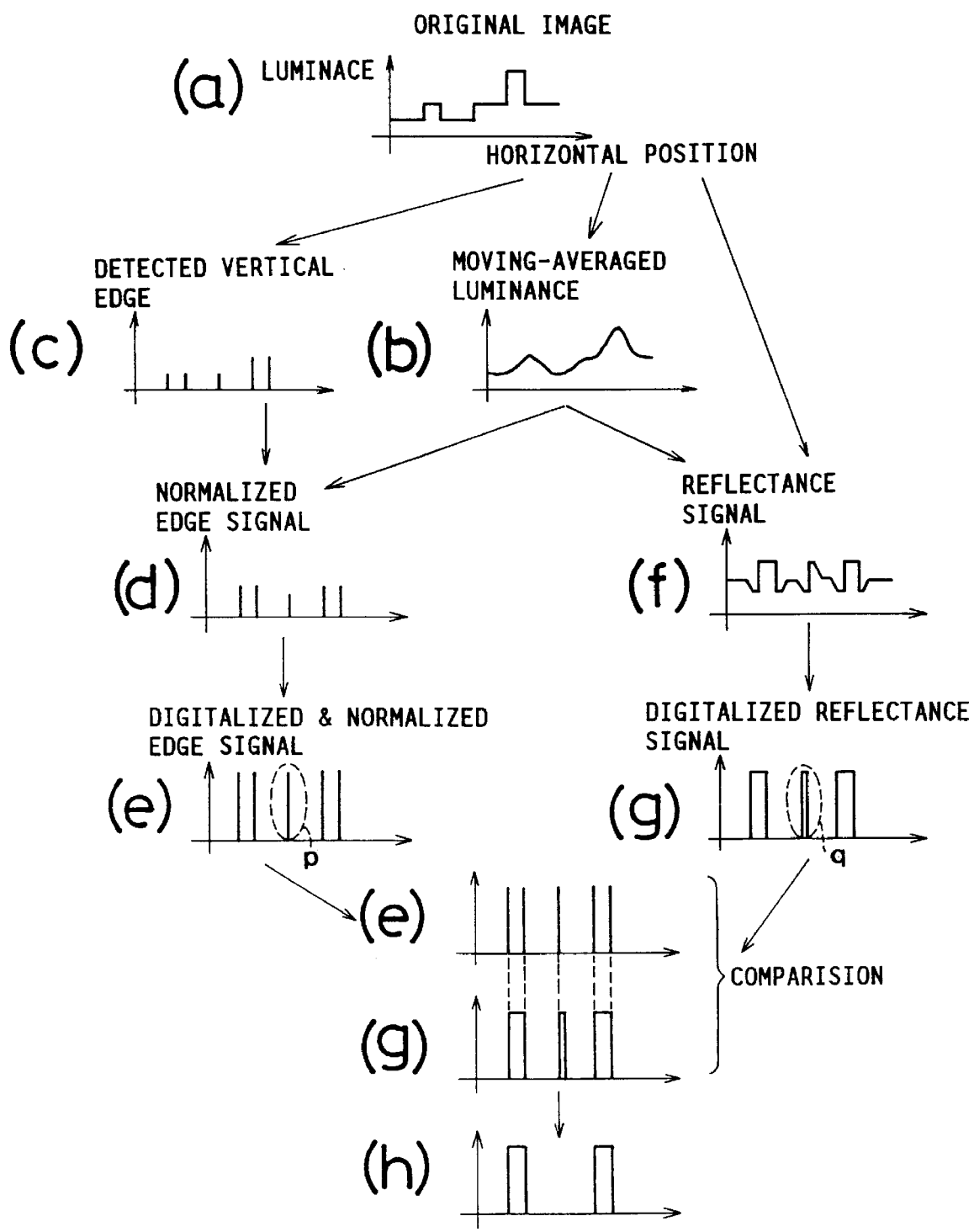
FIGS. 3a–h are a view for describing waveforms which appear at respective process blocks shown in FIG. 2.

Referring to FIG. 1, an image signal is obtained at an image sensing device 10, such as a video camera. The signal is then processed by an image processing apparatus 12, where white lines drawn on a road surface are detected and information of the white lines is outputted from an output device 14. FIG. 2 is a block diagram illustrating process blocks included in the image processing apparatus shown in FIG. 1. In FIG. 2, symbols: a, b, c, . . . , have been put to the output signals of respective process blocks. FIG. 3 depicts waveforms of signals a, b, c, . . . , which appear at the respective process blocks shown in FIG. 2. Now, description of the invention will be made in the order of the process flow shown in FIG. 2.

(Setting pixel train, Moving average of luminance)

An image signal a from the video camera 10 is inputted to the image processing apparatus 12 through the input unit 20. The image signal a is first sent to a pixel train setting unit 21 for setting a pixel train, and then, to a moving average calculating unit 30, together with the information of the pixel train specified by the pixel train setting unit 21, for calculating a moving average of luminance with respect to the pixels in the train for each pixel of attention (A flow of process in the upper part of FIG. 2).

Figures 4, 5:
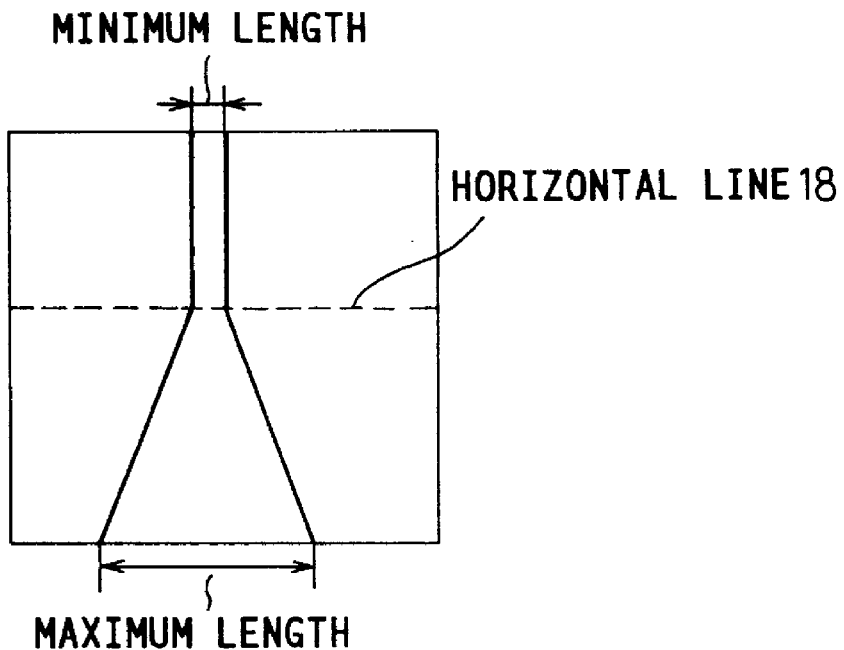
FIG. 4 is a view for describing the length of a pixel train for calculating the moving average of luminance.
FIG. 5 is a view illustrating a mask for detecting edges.

The pixel train setting unit 21, as illustrated in FIG. 4, divides the entire image plane into two portions, one above a horizontal line 18, and the other below it. On the horizontal line and in the upper portion of the image plane, the length of each pixel train is set to a constant, a predetermined minimum length corresponding to the width of the furthest-seen portion of the white line in the image. In the lower part of the image plane, the length of each pixel train is set so as to have an increasingly large length from the minimum length to a predetermined maximum length, which corresponds to the width of the nearest-seen portion of the white line in the image, as the pixel train on a scan line extends in an increasingly low part of the image plane, as expressed by the following formula (7).

$$length = (maximum - minimum)(height\ of\ horizon - height\ of\ scan\ line)/height\ of\ horizon + minimum \quad (7)$$

Figure 6:
FIG. 6 is a photograph of a road surface on which white lines are seen.
Figure 7:
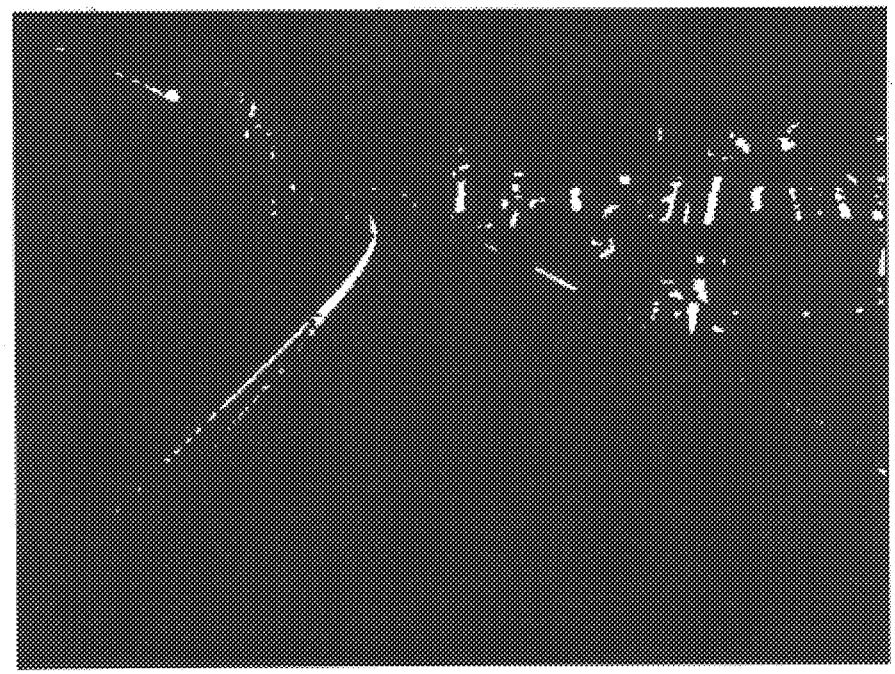
FIG. 7 is a photograph of a processed image showing white lines detected from the photograph of FIG. 6 with an excessively large moving average length over the entire image plane.
Figure 8:
FIG. 8 is a photograph of a processed image showing white lines detected from the photograph of FIG. 6 with an excessively short moving average length over the entire image plane.

The reason why the length of the pixel train is altered depending on the distance of the scan lines below the horizontal line 18 is to provide a proper detectability of the white line for the entire image plane. Namely, when the white line such as shown in FIG. 6 is detected with the pixel train of an excessively short length, the processed image of the white line in the middle to near range becomes divided into two lines, as seen in FIG. 7, because the width of the white line exceeds the length of the pixel train, making edges of the white line stressed too much. On the other hand, when the same white line is detected with pixel trains of an excessively large length, noise and clutter in the distant background become stressed with the white line mixed with the background and indistinct, as seen in FIG. 8. Though a proper length of the pixel train should be determined experimentally, it is preferable to set it 3 to 5 times the width of the white line on the scan line being processed. Similarly, when a target other than the white lines is detected, the length of the pixel train is determined according to the size of the target in the image.

The horizontal line 18 is set, in principle, where an image of hypothetical horizon lies in the image plane, which is at a constant height as far as the camera is held horizontally. If the camera has an elevation or a dip on a sloping road, the height of the horizontal line 18 in the image plane may be adjusted according to the detected elevation or dip. However, such an adjustment will not be requisite, as the effects of the elevation or dip on the length of the pixel train are normally not so large.

The moving average calculating unit 30 calculates a moving average of luminance with respect to the pixels in the train for each pixel of attention moving along the scan line being processed. Here, a median or a mode may be used instead of the average.

(Edge detection, Normalization and Digitalization)

An edge detecting unit 32 detects edges from the image signal a, an edge normalizing unit 38 normalizes the detected edge signal and then a digitizing unit 40 digitizes the normalized edge signal (The right-side process flow in FIG. 2).

The edge detecting unit 32 comprises therein an edge detecting mask shown in FIG. 5. The edge detecting mask is a matrix having 3 rows and 3 columns, each row of which includes elements of −1, 0, and +1. A sum of product operation is performed between the luminance of the pixel of attention accompanied by 8 pixels surrounding it and the corresponding elements of the edge detecting mask. The edge detecting mask shown in FIG. 5 outputs the maximum absolute sum-of-product value for a vertical succession of pixels in front and in rear of which the luminance varies. The larger sum-of-product value is produced, the sharper the variation of the luminance. Thus, a vertical edge is detected there. This mask has not sensitivity to a horizontal edge. However, it can practically detect an edge slanted within approximately ±30° from vertical. This figure is sufficient for the purpose of the invention. As a result, an edge signal c is obtained.

In the edge detection by the edge detecting unit 32 described above, if the moving average of luminance at the location of the pixel of attention is smaller than a judging value, the edge signals detected with respect to the pixel of attention and a few pixels adjacent thereto are averaged, and the detected edge signal is replaced with a thus calculated average of the edge signals, thereby to reduce the effects of noise.

Figure 9:
FIG. 9 is a photograph of a road surface on which white lines and a shadow are seen.

Incidentally, it should be noted that, in the original luminance signal a, there are first and second peaks on the left and right sides of the graph, which correspond to two white lines, together with a stepwise change in the luminance between the first and second peaks. This stepwise change represents a situation where the left side of the road is darkened by a shadow of something in between the two white lines, and the right of the step suddenly becomes light. A similar scene is shown in FIG. 9. The edge detecting mask of FIG. 5 recognizes this stepwise change in the luminance as one edge. This one edge is illustrated as one vertical line p at the center of the graph (e) in FIG. 3.

The edge signal produced by the sum-of-product operation is divided by the moving average of luminance and normalized in the edge normalizing unit 38. Reasons for the normalization are to compensate the following phenomenon. Namely, if the average of the luminance is low in the region where the edge detection is made, the variation of luminance is also restricted to a small value, causing the edge signal value reduced. In the opposite situation, a relatively high edge signal is produced. As a result a normalized edge signal d is obtained.

In the normalizing process described above, if the moving average of the luminance is very small, ie, nearly zero, the dividing operation in the edge normalizing unit 38 tends to be instable. Therefore, the moving average of the luminance is replaced with a "standard value", a constant.

As the result of the processing described above, the normalized edge signal takes either one of the following values:

normalized edge signal e
= edge signal of the pixel/
  moving average of the luminance
= average of edge signals of pixels/
  moving average of the luminance
= average of edge signals of pixels/
  standard value Finally, the normalized edge signal d is digitized by comparing with a threshold in the digitizing unit 40, to obtain a normalized and digitized edge signal e. The above-mentioned stepwise change in the luminance due to the shadow on the road surface is represented in the signal e as one vertical line p in the graph (e) of FIG. 3.
(Calculating reflectance, digitization)

The luminance signal a of the input image is converted into a reflectance signal in the reflectance calculating unit 46, and then digitized in the digitization unit 48 (the right side flow in FIG. 2).

In the reflectance calculating unit 46, the luminance signal a is divided by the moving average of the luminance and a reflectance signal f is obtained. Here, if the moving average of the luminance is very small, ie, nearly zero, the dividing operation in the reflectance calculating unit 46 tends to be instable. Therefore, the moving average of the luminance is replaced with a "standard value", a constant.

Further, if the moving average of luminance at the location of the pixel of attention is smaller than a judging value, the luminance signals a of the pixel of attention and a few pixels adjacent thereto are averaged, and the luminance signals a of the pixel of attention is replaced with a thus calculated average of the luminance signals, thereby to reduce the effects of noise.

As the result of the processing described above, reflectance signal takes either one of the following values: reflectance signal f

--- reflectance signal f
= luminance signal of the pixel/
  moving average of the luminance
= average of luminance signals of pixels/
  moving average of the luminance
= average of luminance signals of pixels/
  standard value

--- finally, reflectance signals f of the pixel of the attention is digitized by comparing with a threshold in the digitizing unit 48, to obtain a digitized reflectance signal g. The above-mentioned stepwise change in the luminance due to the shadow on the road surface is represented in the signal g as one peak g in the graph (g) of FIG. 3.
(Extraction of true edge, elimination of false edge)

Thus-obtained normalized and digitized edge signal e is compared with the digitized reflectance signal g (Flow in the lower part of FIG. 2).

In the normalized and digitized edge signal e, there appears two pair of edges corresponding to two peaks in the luminance signal a representative of the white lines, which also correspond to the two peaks in the left and the right sides of the digitized reflectance signal g. Therefore, these two pairs of edges in the normalized and digitized edge signal e can be judged as true edges.

Figure 10:
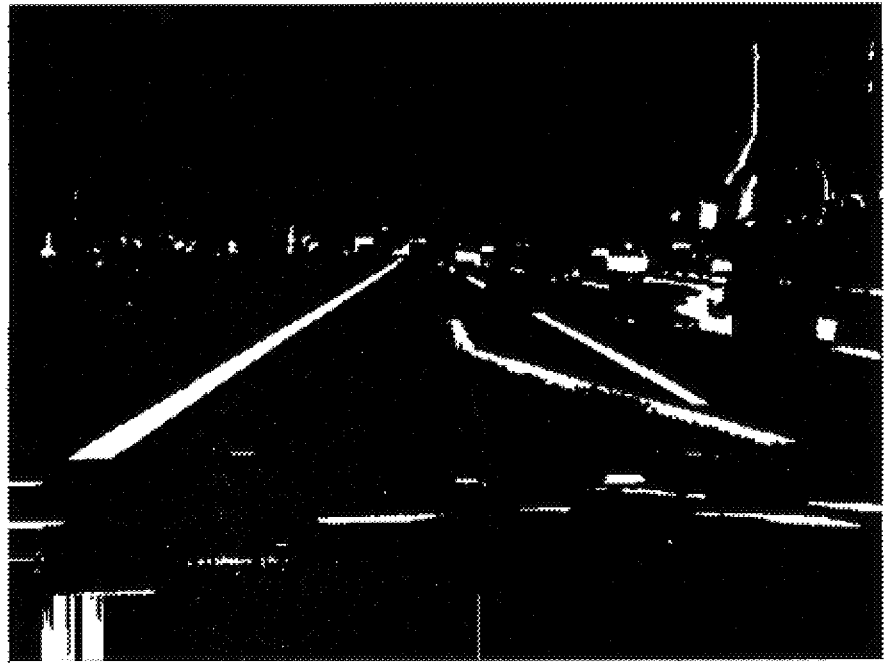
FIG. 10 is a photograph of a processed image showing white lines detected from the photograph of FIG. 9 without elimination of false edges.
Figure 11:
FIG. 11 is a photograph of a processed image showing white lines detected from the photograph of FIG. 9, in which false edges have been eliminated.

On the other hand, though the single edge p in the center of the normalized and digitized edge signal e, corresponds to the rising end of the single peak g in the digitized reflectance signal g, the falling end of the single peak g has no counterpart. Therefore, the single edge p is judged as being a false edge, and eliminated from the image plane (FIG. 3 (h)). FIG. 11 shows a processed image in which the false edges appearing in FIG. 10 have been eliminated.

The processed signal h is corrected for missing scan lines or the like in a median filter 52, then, transmitted to an output device 14, and outputted to the outside.
(Miscellaneous)

1. In the above embodiment, the image signal is stably digitized irrespective of brightness or darkness of the image by use of the reflectance obtained by dividing the luminance signal of each pixel by the moving average of the luminance, based on the formula (4). However, instead of the formula (4) the following formula (8) can also be useful.

$$reflectance = (luminance\ of\ pixel + 1)/(averaged\ luminance\ of\ pixels + m) \quad (8)$$

Where 1 is a correction factor for effects of illuminating means upon the luminance, m is a correction factor for effects of illuminating means upon the averaged luminance.

2. In the above embodiment, the average of the luminance is calculated as a moving average of the luminance with respect to the pixel of attention and pixels adjacent thereto. However, if there is not ambient light at all, the road surface must be illuminated by the lighting units provided in the vehicle. In this situation, the illuminating characteristics of the lighting units of the vehicle have been known, the road surface conditions also can be known, or at least they can be set beforehand according to the weather conditions. Therefore, these known data can be stored in the form of a table, and the illuminating conditions of the road surface can be obtained without laborious calculation. In a situation where a small quantity of ambient light is present, the above-mentioned situation can substantially exist in many cases.

3. In the above embodiment, as seen from FIGS. 9 and 11, noise and clutter which can be obstruction to the detection of the white lines are eliminated quite well. Though there are still a little of them, they are practically harmless, because when a well-guided vehicle is running on the road whose construction is well known, the location in the image plane where the white line will appear is also predictable. A watching frame in which the white lines can be detected without hazardous noise and clutter can be set in the image plane by making use of these information.

Figure 12:
FIG. 12 is a photograph of a road surface on which white lines and shadows of guardrails whose false edges are difficult to be eliminated.
Figure 13:
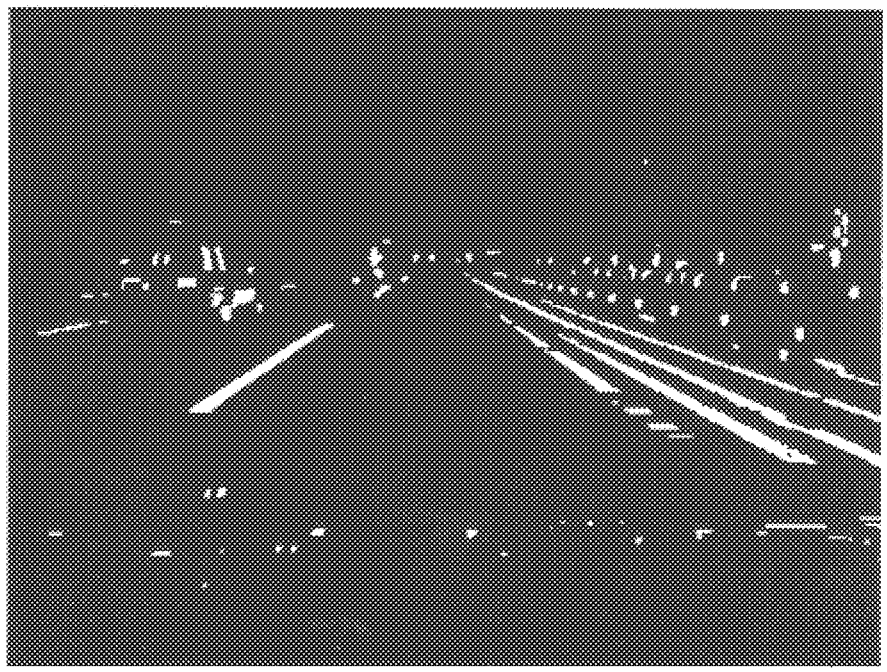
FIG. 13 is a photograph of a processed image in which elimination of false edges due to the shadows shown in FIG. 12 have been failed.

4. In the above embodiment, false edges due to the shadows on the road surface are eliminated. However, in order for the boundary of brightness and darkness to be satisfactorily detected for its elimination, the width of the bright or dark region must be quite wider than that of the white line. If the bright region, for instance, has as wide as the white line, if it appears in the image plane in a similar fashion as the white line, and if it bears a strong contrast against the background, as exemplified by brightness the shadows made by guard rails in FIG. 12, the false edges cannot be detected, in principle. In fact, the false edges have not been eliminated in the case of FIG. 12 as seen in FIG. 13. However, the present invention is still practically usable because the location where the true white line will appear is predictable by use of information of the white line which have been until now detected or on the width of the lane on which the vehicle is running.

5. In the above embodiment, the false edge is detected and eliminated by comparing signals e and g. However, there can be other scheme of detecting the false edge. For example, such a comparison can be made between signals d and g, and also between signals c and g. Now, assume a signal d' which is produced by subtracting signal b from signal a, a signal f' which is produced by subtracting signal b from signal c, and signals e' and g' are also obtained in the similar manner. Then, it will be possible to compare signals c and g', signals d' and g' and signals e' and g'.

Having now fully described the invention, it will be apparent to those skilled in the art that many changes and modification can be made without departing from the spirit or scope of the invention as set forth herein.

What is claimed is:

1. An image processing apparatus for processing an image of a roadway, said image including a plurality of pixels, each pixel having a luminance representative of an intensity of reflected light from said roadway, wherein said roadway is exposed to and illuminated by a source of non-stroboscopic ambient light having a diurnal variation, said apparatus comprising:

estimating means for estimating an intensity of said ambient light illuminating the roadway at a location of a pixel of attention;

means for outputting an image signal representative of a luminance of said pixel of attention;

reflectance calculating means for converting the luminance of said pixel of attention into a reflectance, wherein said reflectance is determined by dividing the luminance of said pixel of attention by said estimated intensity of said ambient light illuminating the roadway at the location of said pixel of attention;

digitizing means for binary-digitizing the reflectance of said pixel of attention by comparing the reflectance of said pixel of attention with a threshold value, and for outputting a digitized reflectance signal; and boundary recognizing means for recognizing a boundary of said roadway, said boundary of said roadway being defined by regions having digitized reflectance signal values different from each other in the image.

2. An apparatus according to claim 1, wherein said estimating means comprises:

pixel train setting means for setting a pixel train having therein the pixel of attention and a specified number of pixels adjacent to the pixel; and moving average calculating means for estimating the intensity of light illuminating the roadway at the location of the pixel as a moving average of luminance calculated for said pixel train.

3. An apparatus according to claim 2, wherein said boundary recognizing means comprises:

edge detecting means for detecting, at the location of the pixel of attention, an edge as a succession of pixels in front and in rear of which the luminance of the image changes sharply, and for outputting an edge signal; and comparing means for comparing said digitized reflectance signal with said edge signal to detect a boundary of regions in the image having different luminance from each other, thereby to eliminate a part of the digitized reflectance signal corresponding to the detected boundary due to the difference of luminance.

4. An apparatus according to claim 3, wherein said edge detecting means is sensitive to vertical edges.

5. An apparatus according to claim 3, wherein said boundary recognizing means comprises normalizing means for normalizing said edge signal at the location of the pixel of attention, with the edge signal divided by the estimated intensity of light illuminating the roadway at the location of the pixel, and for outputting a normalized edge signal.

6. An apparatus according to claim 5, wherein said boundary recognizing means comprises digitizing means for binary-digitizing said normalized edge signal by comparing the normalizing edge signal with a threshold value, and for outputting a normalized and digitized edge signal.

7. An apparatus according to claim 3, wherein said edge detecting means determines if the moving average of luminance calculated with respect to the pixel train at the location of the pixel of attention is smaller than a judging value, and then replaces the edge signal at the location of the pixel of attention with an average of the edge signal at the location of the pixel of attention and edge signals respectively at the location of a few pixels adjacent to the pixel of attention when the determination is affirmative.

8. An apparatus according to claim 2, wherein said pixel train setting means sets the pixel train having the length which varies depending on the location of the pixel of attention in an image plane.

9. An apparatus according to claim 8, wherein said pixel train setting means sets the pixel train having the length which varies in relation to the widths of regions whose boundary said recognizing means is recognizing.

10. An apparatus according to claim 9, wherein said pixel train setting means divides the image plane into upper and lower portions at the image of a hypothetical horizon, and sets the pixel train having the length which varies depending on in which portion of the upper and lower portions of the image plane the pixel of attention falls.

11. An apparatus according to claim 8, wherein said pixel train setting means sets the pixel train having a constant minimum length on the image of the hypothetical horizon and in the upper portion of the image plane, and the pixel train having an increasingly large length as the pixel of attention is at an increasingly low location in the lower portion of the image plane.

12. An apparatus according to claim 2, wherein said reflectance calculating means determines if the moving average of luminance calculated for the pixel train at the location of the pixel of attention is smaller than a judging value, and then replaces the luminance of the pixel of attention with an average of luminance with respect to the pixel of attention and a few pixels adjacent thereto when the determination is affirmative.

13. An apparatus according to claim 2 wherein said reflectance calculating means determines if the moving average of luminance calculated for the pixel train at the location of the pixel of attention is smaller than a standard value, and then replaces the moving average of luminance with the standard value when the determination is affirmative.

14. An apparatus according to claim 2, wherein said edge detecting means determines if the moving average of luminance calculated with respect to the pixel train at the location of the pixel of attention is smaller than a standard value, and then replaces the moving average of luminance with the standard value when the determination is affirmative.

15. An image processing apparatus for processing a signal representing a video image of a roadway, said video image including a plurality of pixels, each pixel having a luminance representative of an intensity of light reflected from said roadway, wherein a plurality of said pixels are exposed to and illuminated by a source of non-stroboscopic ambient light having a diurnal variation in intensity, said apparatus comprising:

a video camera for generating an image signal representing the luminance of each of a plurality of pixels located at a plurality of pixel locations within said video image;

a reflectance determination circuit for receiving said image signal and converting the luminance of each of said plurality of pixels to a reflectance value, wherein said reflectance value of a selected pixel is determined by dividing the luminance of the selected pixel by a value representing the intensity of said ambient light at the location of the selected pixel; and a boundary detection circuit for generating a signal representative of a boundary between pixel locations having reflectance signal values different from each other, said boundary defining a boundary of said roadway.

16. An image processing apparatus for processing a signal representing a video image of a roadway, said apparatus comprising:

a video camera for generating an image signal representing a luminance of each of a plurality of pixels located respectively at a plurality of pixel locations within an image of said roadway;

a processing unit for receiving said image signal and converting the luminance of each of said plurality of pixels to a reflectance value, wherein the reflectance value of a selected pixel is determined by dividing the luminance of the selected pixel by a value representing an intensity of non-stroboscopic ambient light illuminating said roadway at the location of the selected pixel, said non-stroboscopic ambient light having a diurnal variation; and a boundary detection circuit for generating a signal representative of a boundary between pixel locations having reflectance signal values different from each other, said boundary defining a boundary of said roadway.

17. The image processing apparatus of claim 16 wherein said processing unit generates said value representing said intensity of ambient light at a selected pixel location by calculating a moving average of the luminance of each selected pixel and a predetermined number of pixels adjacent to each selected pixel.

18. A machine implemented process for identifying a boundary of a roadway, wherein said roadway includes regions illuminated by varying amounts of non-stroboscopic ambient light, said process comprising the steps of:

generating an image signal representing an image of said roadway, said image of said roadway comprising a plurality of pixels located respectively at a plurality of pixel locations;

generating a luminance value for each of said pixels comprising said image of said roadway;

converting each said luminance value to a reflectance value by dividing the luminance value of a selected pixel by an average luminance of said selected pixel and a predetermined number of adjacent pixels; and generating a signal representing a boundary of said roadway by identifying adjacent pixel locations having different reflectance values.

* * * * *